Dec. 19, 1950 F. H. WELLS 2,534,746

DECODER

Filed Feb. 1, 1946 3 Sheets-Sheet 1

Inventor
FRANK H. WELLS

By Ralph L. Chappell

Attorney

Dec. 19, 1950 F. H. WELLS 2,534,746

DECODER

Filed Feb. 1, 1946 3 Sheets-Sheet 2

Inventor
FRANK H. WELLS

By Ralph L. Chappell

Attorney

Dec. 19, 1950 F. H. WELLS 2,534,746

DECODER

Filed Feb. 1, 1946 3 Sheets-Sheet 3

Inventor

FRANK H. WELLS

By Ralph L Chappell

Attorney

Patented Dec. 19, 1950

2,534,746

UNITED STATES PATENT OFFICE 2,534,746

DECODER

Frank H. Wells, Malvern Link, England, assignor to Minister of Supply, in His Majesty's Government of the United Kingdom of Great Britain and Northern Ireland, London, England Application February 1, 1946, Serial No. 644,968

6 Claims. (Cl. 177—353)

This invention relates to decoders, and more particularly to pulse decoders operative to produce an output signal in response to reception of a plurality of input signals spaced apart a predetermined time interval.

In systems using propagation of pulses of radio frequency energy, it is sometimes desired that the pulse receiver respond only to certain pulse groups having predetermined characteristics. One method of characterizing, or coding, such pulse groups is by pulse spacing. For example, a plurality of pulses forming a pulse group may be characterized by a predetermined time spacing between pulses. For such a system it is required that the pulse receiver respond only to groups of pulses of predetermined number and spaced apart by a predetermined time interval. For the purpose of insuring that only the desired signal will be passed through the receiver, it is necessary to employ some form of pulse decoder.

It is an object of this invention to produce a decoder for use in a pulse receiver capable of producing an output pulse following reception of a predetermined number of input pulses spaced apart a predetermined time interval.

It is another object of this invention to produce a decoder capable of responding only to at least two input pulses spaced apart a predetermined time interval, and which will be insensitive to a single long pulse extending over the predetermined time interval.

It is another object of this invention to produce a decoder which will function to shape discrete pulses of predetermined duration from each input signal applied thereto, and which will be operative to delay the pulses thus shaped and to reshape them before application to a coincidence response means.

It is a further object of this invention to produce a decoder responsive to at least three pulses spaced apart by a predetermined time interval.

It is an additional object of this invention to produce a decoder characterized by a pair of coincidence response means to which pulses are applied both directly, and indirectly through a time delay means, so that an output will be derived from the coincidence response means only when the decoder is energized by a plurality of pulses spaced apart a predetermined time interval equal to the time delay of the delay means.

In accordance with these objects and with further objects which will become apparent, this invention will now be described in connection with the accompanying drawings in which, Fig. 1 is a decoder circuit forming one embodiment of this invention and employing a single coincidence response means and a single time delay means;

Figure 1:
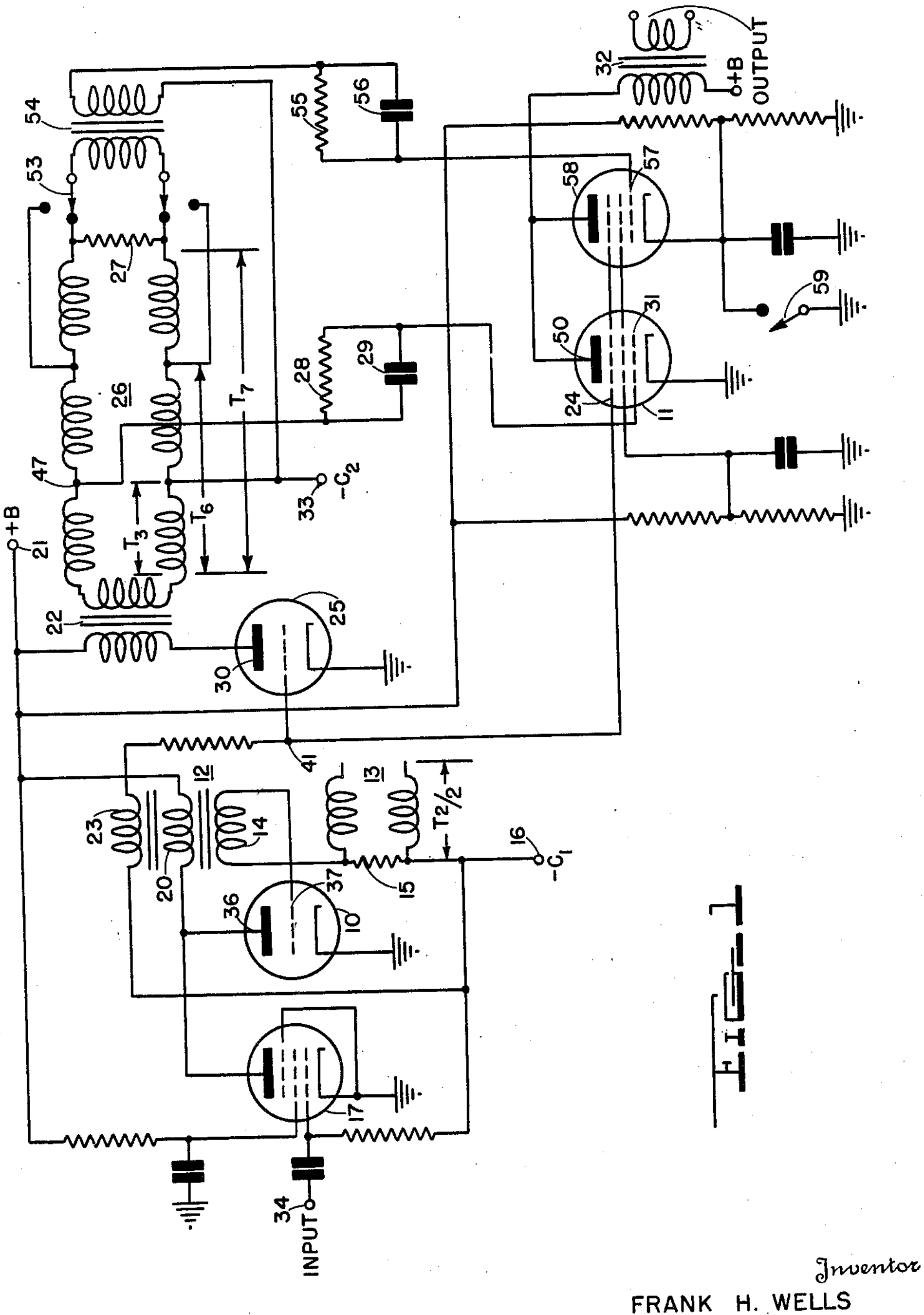

Under certain circumstances, a decoder, normally designed to respond to a pair of pulses spaced apart a predetermined time, might respond to a single pulse having a duration equal to, or greater than, the predetermined time interval to which the decoder was designed to respond. One feature of this invention concerns a means for overcoming such an objection in a decoder. As will be explained more fully hereinafter, this means comprises a pulse shaping circuit operative to produce a single discrete pulse of predetermined duration in response to application thereto of a wave front of proper polarity.

A common fault in certain time delay means is that of distortion of an input pulse, so that at the output of the time delay means the pulse is lengthened in duration. One feature of this invention concerns a means for reshaping output pulses from the time delay means so that the duration of a given output pulse will be limited to that of the input pulse applied to the delay line. This will permit of more accurate coincidence mixing of the delayed pulse with a non-delay pulse.

Referring to Fig. 7, there is shown a decoder circuit embodying pulse shaping and re-shaping means. The decoder comprises principally two tubes 10 and 11. Tube 10 is part of a pulse shaping circuit in the form of a blocking oscillator having, in addition to tube 10, transformer 12, and pulse shaping network 13. Winding 14 of transformer 12 is in the grid circuit of tube 10, as is resistor 15 across which is connected a pulse forming network, in the form of open circuited delay line 13. To grid bias return terminal 16, is applied a source of negative potential $-C_1$. The plate of tube 10 is connected through winding 20 of transformer 12 to the terminal 21 connected to plate supply voltage +B. Input signals to the decoder, applied at terminal 34 to the grid of tube 17, serve to trigger the plate of blocking oscillator 10. Output from blocking oscillator 10 is taken from winding 23 and applied simultaneously to grid 24 of coincidence tube 11, and through amplifying tube 25 and transformer 22, to the input terminals of a time delay network, or delay line 26. Output from delay line 26, which is terminated in its characteristic impedance by resistor 27, is taken from terminal 47 and applied to grid 31 of coincidence tube 11, through a pulse reshaping network comprising resistor 28 and capacitor 29. Output is taken from plate 50 of tube 11 through transformer 32. Grid 24 of tube 11 is returned to bias terminal 16, while grid 31 is returned to bias terminal 33 to which is connected a negative source of potential $-C_2$.

Figure 2:
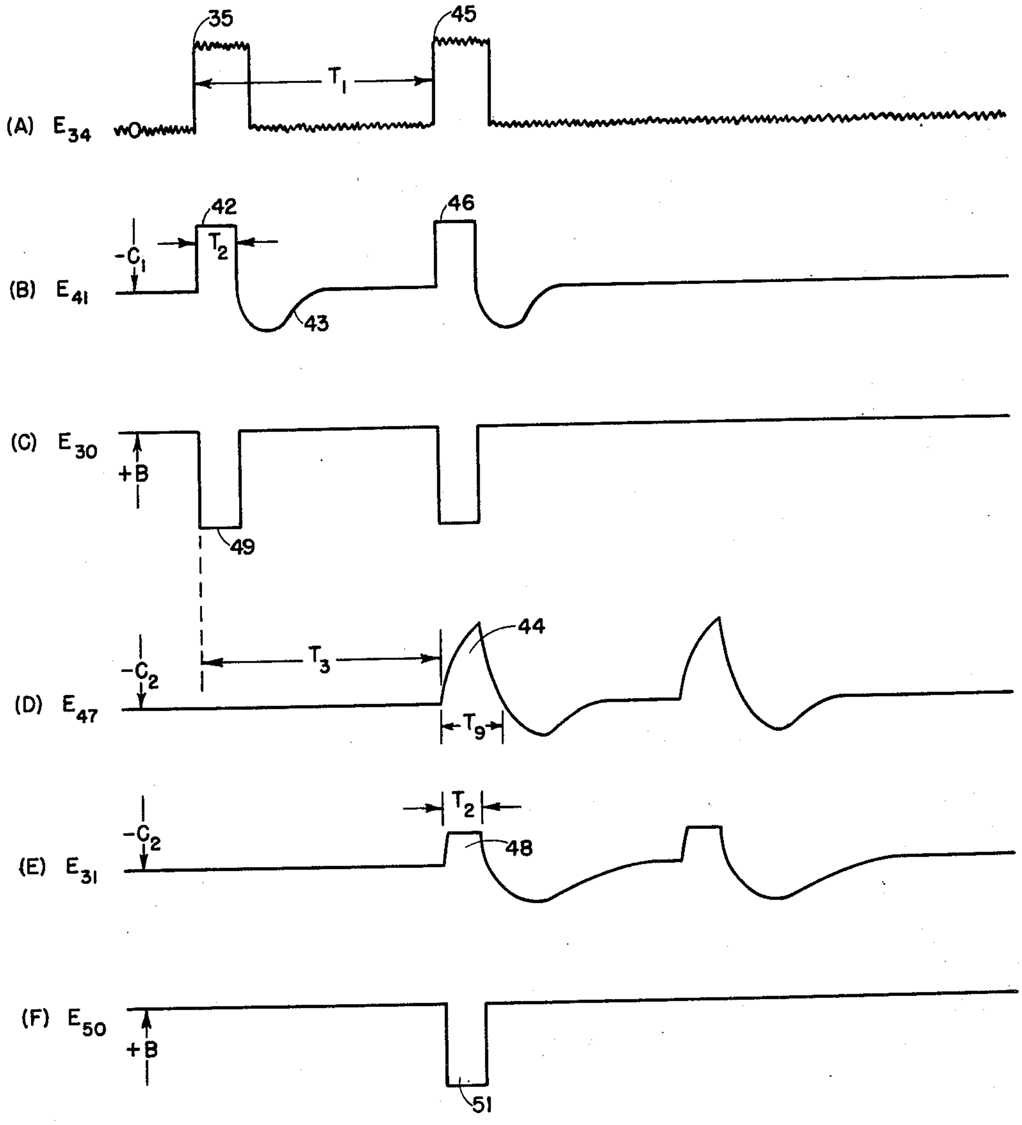
Fig. 2 illustrates somewhat schematically certain wave forms in the circuit of Fig. 1.

The operation of the decoder circuit of Fig. 1 will best be understood by reference to Fig. 2, wherein the various wave forms (A), (B), (C), (D), (E), and (F), represent various wave forms in the circuit. Fig. 2 (A) illustrates an input signal to be decoded and passed by the decoder of Fig. 1, and represents the pulse wave form applied to input terminal 34, $E_{34}$. The leading edges of the two input pulses 35 and 45 are spaced apart a time $T_1$. The leading edge of pulse 35 will trigger plate 36 of the blocking oscillator 10, and will start flow of current through winding 20 of transformer 12. Through winding 14, a positive voltage will be applied to grid 37 of tube 10, which action will further increase the plate current through winding 20. This effect will be rapidly cumulative so that a steep wave front of negative voltage will appear on plate 36 of tube 10.

Current flowing in the circuit of grid 37 of tube 10 will start a pulse of negative polarity down open circuited relay line 13, which will return to resistor 15 after a predetermined time $T_2$; and by virtue of its negative polarity will apply sufficient bias to grid 37 to block conduction in tube 10, thus terminating the pulse. A detailed description of the operation of this form of oscillator may be found in application S. N. 602,146, filed June 28, 1945, in the name of Martin Fischman.

The pulse of current thus produced in winding 20 of transformer 12 will also appear in winding 23 with positive polarity, as shown at 42 in Fig. 2 (B), which illustrates the voltage at point 41, connected to the grid of tube 25. This voltage will be applied simultaneously to grid 24 of coincidence tube 11 and to the grid of amplifying tube 25. The trailing edge of pulse 42 overshoots, to form a negative tail 43 by virtue of the action of pulse transformer 12. Upon application of pulse 42—43 of Fig. 2 (B) to amplifying tube 25, which is biased to cut-off by biasing voltage $-C_1$, the output pulse 49 at anode 30 of tube 25 will consist only of the main pulse of negative polarity as shown in Fig. 2 (C).

The wave form $E_{30}$ shown in Fig. 2 (C) is reversed in polarity in transformer 22, and is applied positively to the input terminals of delay line 26. A predetermined time, $T_3$, after application to the input terminals of delay line 26, the first pulse 49 will appear at terminal 47 as pulse 44 of Fig. 2 (D).

It will be noted that pulse 44 has been distorted, so that its total duration, from beginning to end, is $T_9$, which is greater than $T_2$, the duration of input pulse 49 applied to delay line 26. In order to limit the effective duration of pulse 44, a reshaping circuit is used, comprising resistor 28 and capacitor 29. As pulse 44 is applied through resistor 28 and capacitor 29 to grid 31 of tube 11, the voltage on grid 31, $E_{31}$, will rise to a predetermined point, at which grid current will flow, thereby limiting $E_{31}$, as shown at 48 in Fig. 2 (E), and charging capacitor 29. When pulse 44 starts to decrease, capacitor 29 will discharge through resistor 28 much more slowly than it charged through grid current, so that the trailing edge of pulse 48 is applied to grid 31 causing a sudden drop in voltage at this point. Thus the duration of pulse 48 applied to grid 31 will be substantially $T_2$, or the same as that of the originally limited pulse 42 applied directly to grid 24 of tube 11.

If, in the meantime, a second positive going wave front has been applied to input terminal 34, as shown at 45 in Fig. 2 (A), a second pulse 46 will appear at terminal 41 and will be applied to grid 24 of tube 11. If the time $T_1$ between input pulses 35 and 45 is equal to time $T_3$, the delay time in line 26, pulse 46 will appear on grid 24 simultaneously with the appearance of pulse 48 on grid 31. The biases on these grids are so adjusted that both grids must receive a positive pulse simultaneously in order to produce an output pulse at anode 50 of tube 11. When this occurs, as shown at 48 and 46 in Figs. 2 (E) and 2 (B), respectively, pulse 51 will appear at plate 50 of tube 11 as shown in Fig. 2 (F).

It will thus be seen that an output pulse will be produced in the circuit of Fig. 1 only when there is applied to the input terminal thereof a pair of positive-going voltage waves spaced apart by the predetermined delay time $T_3$ of delay line 26. A single, long-duration pulse will not produce the desired output, because only a single discrete pulse of predetermined duration would appear at terminal 41 by virtue of the action of the blocking oscillator 10.

The circuit of Fig. 1 also includes means whereby a second pulse spacing may be decoded concurrently with the pulse coding $T_3$ described above. This is accomplished by extending delay line 26 and tapping at the points $T_6$ and $T_7$ as shown. A switch 53 is employed to apply selectively either the $T_6$ or the $T_7$ coding to transformer 54, from the secondary of which the pulse is applied through the reshaping circuit, comprising resistor 55 and capacitor 56, to grid 57 of coincidence tube 58. The operation of components 55, 56, 57 and 58 corresponds with the operation of the above described components 28, 29, 31 and 11 respectively.

A switch 59 is employed to give selectivity in the use of the third coded pulse. With switch 59 open as shown, tube 58 will have its cathode biased far above cut-off, so that an output pulse will not appear on its plate even though pulses should coincide on its input grids. With switch 59 closed, the cathode of tube 58 will be grounded, and it will be biased for operation the same as tube 11.

With switch 53 in the position shown, and switch 59 closed, a two-pulse code spaced apart by either $T_3$ or $T_7$ will be decoded and will produce a decoder output pulse. If three pulses are applied to the input of the decoder under the condition assumed, the second pulse being spaced $T_3$ from the first, and the third pulse being spaced $T_7$ from the first, two output pulses will appear in output transformer 32, spaced apart by a time ($T_7$—$T_3$). With switch 53 in the other position, and switch 59 closed, a two-pulse code spaced apart either $T_3$ or $T_6$ will produce a decoder output pulse.

Under certain circumstances it may be desired to use three or more pulses, instead of the pair of pulses described in connection with Fig. 1. The circuit of Fig. 3 is adapted for such use and comprises two coincidence response means in the form of coincidence tubes 60 and 61.

Figure 3:
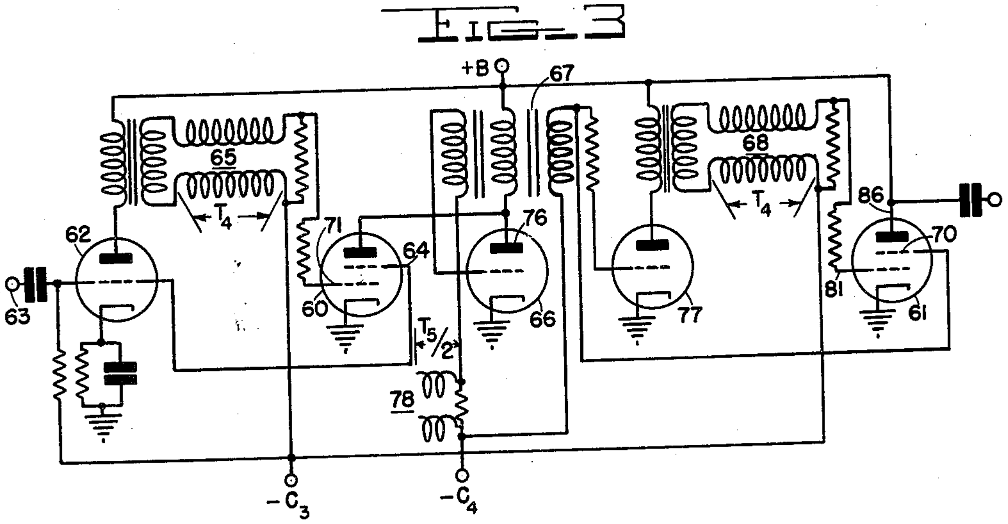
Fig. 3 illustrates another embodiment of this invention employing two coincidence response means and two time delay means.

The operation of the circuit of Fig. 3 is somewhat similar to that of Fig. 1. In the particular embodiment shown, the blocking oscillator has been omitted in front of the first delay line, only a simple amplifier 62 being used. It will be understood that a pulse forming means such as the blocking oscillator 10 of Fig. 1, may be used if desired. As shown, input pulses at terminal 63 are applied simultaneously to grid 64 of tube 60 and to the input of delay line 65. Output from the plate of tube 60 triggers a blocking oscillator 66, which functions in a manner similar to the blocking oscillator 10 of Fig. 1. Output from the blocking oscillator 66 is applied simultaneously to the input terminals of delay line 68 thru amplifier 77 and to grid 70 of coincidence tube 61. Reshaping circuits corresponding to 28—29 and 55—56 of Fig. 1 have not been incorporated into the circuit of Fig. 3, although it is to be understood that such circuits could be so incorporated if desired.

Figure 4:
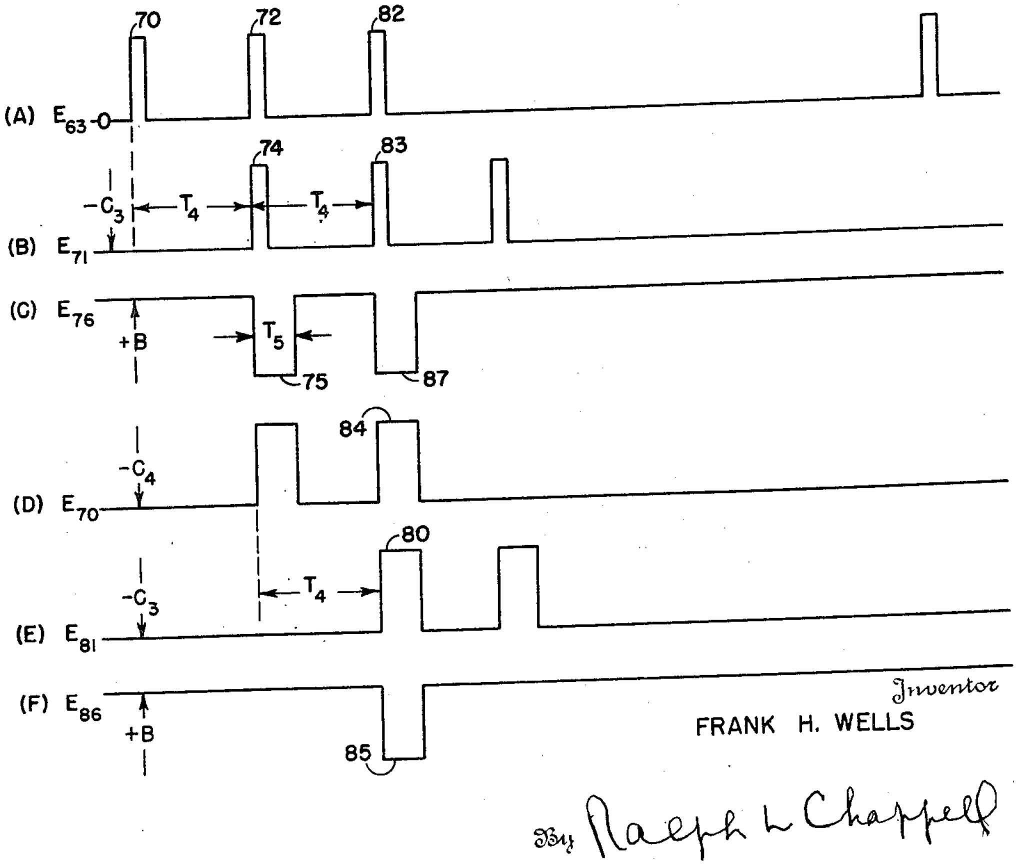
Fig. 4 illustrates schematically certain pulse wave forms in the circuit of Fig. 3.

The operation of the circuit of Fig. 3 will be easily understood by reference to the symbolic wave forms of Fig. 4. Fig. 4 (A) illustrates the voltage $E_{63}$ applied to the input terminal 63 of the decoder of Fig. 3. This voltage is applied simultaneously to grid 64 of coincidence tube 60 and, through amplifier 62, to the input terminals of delay line 65. After a predetermined time $T_4$, input pulse 70 of Fig. 4 (A) appears at grid 71 of coincidence tube 60, as shown at 74 in Fig. 4 (B). In the meantime, a second input pulse 72 has been applied to input terminal 63. If the time between pulses 70 and 72 is equal to $T_4$, the delay time in line 65, pulse 72 will coexist with delayed pulse 74 appearing on grid 71, and the concurrence of the two will produce an output pulse at the plate of coincidence tube 60. This output pulse will trigger the blocking oscillator 66, so that at the plate 76 thereof, a pulse 75 (Fig. 4 (C)) of predetermined time duration $T_5$ will appear. This pulse will be inverted in transformer 67 and will be applied simultaneously to grid 70 of coincidence tube 61 and, through amplifier 77, to the input terminals of delay line 68.

Delay line 68 will delay pulse 75 a time $T_4$, following which it will be applied as pulse 80 to grid 81 of coincidence tube 61, as shown in Fig. 4 (E). If now a third pulse 82 spaced at time $T_4$ from the second pulse 72 is applied to input terminal 63, it will combine with the delayed second pulse 83 to produce a second pulse 87 on the anode 76 of blocking oscillator 66. This second pulse will be inverted in transformer 67 and will appear on grid 70 as pulse 84, coinciding in time with the application to grid 81 of delayed pulse 75, appearing as pulse 80 in Fig. 4 (E). Pulses 84 and 80, appearing on grids 70 and 81, respectively, thus coincide to produce a single output pulse 85 on anode 86 of coincidence tube 61.

It will, therefore, be seen that a group of three pulses spaced apart a predetermined time interval $T_4$, equal to the delay represented by each delay line, 65 and 68, will produce a single output pulse 85 of predetermined duration. Likewise it will be apparent that by virtue of the action of the blocking oscillator 66, a single long pulse enduring for a time equal to $2T_4$ will not produce a response at the output of the decoder.

The wave forms illustrated in Figs. 2 and 4 have been illustrated schematically and do not necessarily represent the exact configuration of pulses in the circuits, which in certain cases is quite complex.

In actual operation, the circuit parameters of Figs. 1 and 3 may have the following values:

*Fig. 1*

Tube 10, 6J6(½)
Tube 11, 6AS6
Tube 17, 6AK5
Tube 25, 6J6(½)
Tube 58 6AS6
+B, 300 volts
$-C_1$, −30 volts
$-C_2$, −15 volts
Delay line 13, 0.3 microsecond ($T_2/2$)
Delay line 26:
  3 microseconds ($T_3$)
  4 microseconds ($T_6$)
  5 microseconds ($T_7$)
Pulse transformer 12:
  Winding 20, 90 turns
  Winding 14, 60 turns
  Winding 23, 50 turns
  Resistors 28 and 55, 10,000 ohms
  Resistor 27, 560 ohms
  Capacitors 29 and 56, 50 micro-microfarads

*Fig. 3*

Tube 60, 6AS6
Tube 61, 6AC7
Tube 62, 6AG7
Tube 66, 6SN7(½)
Tube 77, 6SN7(½)
Delay lines 65 and 68, 5 microseconds ($T_4$)
Delay line 78, .5 microsecond ($T_5/2$)

The tubes above listed are those contained in the "Radio Amateurs Handbook" 1946 edition.

Although I have shown and described certain specific embodiments of the invention, I am fully aware of the many modifications possible thereof. This invention is not to be restricted except insofar as is necessitated by prior art and the spirit of the appended claims.

What is claimed is:

1. In a decoder for delivering an output signal in response to reception of a plurality of input signals spaced apart a predetermined time interval and inoperative to a single pulse extending over said predetermined time interval, pulse generator means operative to produce a single discrete pulse of predetermined duration in response to the leading edge of each input signal applied to the decoder, coincidence response means effective to produce an output signal in response to coincident application thereto of a plurality of pulses, circuit means effective to apply each said discrete pulse to said coincidence response means, and a delay circuit effective to delay and then apply each said discrete pulse to said coincidence response means.

2. In a decoder for delivering an output signal in response to reception of a plurality of input signals spaced apart a predetermined time interval and inoperative to a single pulse extending over said predetermined time interval, a blocking oscillator comprising means operative to initiate a single discrete output pulse upon reception of an input signal and means terminating said pulse a predetermined time after initiation thereof, coincidence response means effective to produce an output signal in response to coincident application thereto of a plurality of pulses, circuit means effective to apply each said discrete pulse to said coincidence response means, and a delay circuit effective to delay and then apply each said discrete pulse to said coincidence response means.

3. In a decoder for delivering an output signal in response to reception of a plurality of input signals spaced apart a predetermined time interval and inoperative to a single pulse extending over said predetermined time interval, pulse generator means operative to produce a single discrete pulse of predetermined duration in response to the leading edge of each input signal applied to the decoder, coincidence response means effective to produce an output signal in response to coincident application thereto of a plurality of pulses, circuit means effective to apply each said discrete pulse to said coincidence response means, a delay circuit effective to delay and then apply each said discrete pulse to said coincidence response means, and pulse reshaping means interposed between said delay circuit and said coincidence response means effective to reshape each said discrete pulse after passage through said delay circuit.

4. In a decoder for delivering an output signal in response to reception of a plurality of input pulse signals spaced apart a predetermined time interval and inoperative to a single pulse extending over said predetermined time interval, first coincidence response means effective to produce an output pulse in response to coincident application thereto of a plurality of pulses, an input circuit effective to apply said input pulses to said first coincidence response means, a delay circuit effective to delay and then apply said input pulses to said first coincidence response means, second coincidence response means effective to produce an output pulse in response to coincident application thereto of a plurality of pulses, circuit means effective to apply output pulses from said first coincidence response means to said second coincidence response means, and a delay circuit effective to delay and then apply output pulses from said first coincidence response means to said second coincidence response means, thereby to produce a decoder output signal.

5. In a decoder for delivering an output signal in response to reception of a plurality of input pulse signals spaced apart a predetermined time interval and inoperative to a single pulse extending over said predetermined time interval, first coincidence response means effective to produce an output pulse in response to coincident application thereto of a plurality of pulses, a first delay circuit effective to delay and then apply said input pulses to said first coincidence response means, first circuit means effective to apply said input pulses to said first coincidence response means and to said first delay circuit, second coincidence response means effective to produce an output pulse in response to coincident application thereto of a plurality of pulses, a second delay circuit effective to delay and then apply pulses to said second coincidence response means, and second circuit means effective to apply output pulses from said first coincidence response means to said second coincidence response means and to said second delay circuit, one of said circuit means comprising a pulse generator operative to produce a single discrete pulse of predetermined duration in response to each pulse applied thereto.

6. In a decoder for delivering an output signal in response to reception of at least three input pulse signals separated apart a predetermined time interval, a first coincidence tube having anode and control means and effective to produce an anode output pulse in response to simultaneous application to its control means of a pair of input pulses, first energy storage means having input and output terminals and effective to produce a pulse at said output terminals a predetermined time after application of a pulse to said input terminals, input means for applying said input pulses to the control means of said first coincidence tube and to the input terminals of said first energy storage means, circuit means connecting the output terminals of said first energy storage means with the control means of said first coincidence tube, a second coincidence tube having anode and control means and effective to produce an anode output pulse in response to simultaneous application to its control means of a pair of input pulses, second energy storage means having input and output terminals and effective to produce a pulse at said output terminals a predetermined time after application of a pulse to said input terminals, circuit means connecting the anode of said first coincidence tube to the input terminals of said second energy storage means and to the control means of said second coincidence tube, and circuit means connecting the output terminals of said second energy storage means to the control means of said second coincidence tube.

FRANK H. WELLS.

REFERENCES CITED

The following references are of record in the file of this patent:

UNITED STATES PATENTS

| Number | Name | Date |
|---|---|---|
| 2,777,000 | Bingley | Mar. 17, 1942 |
| 2,409,577 | Matson | Oct. 15, 1946 |
| 2,415,359 | Loughlin | Feb. 4, 1947 |
| 2,418,127 | Labin | Apr. 1, 1947 |
| 2,444,741 | Loughlin | July 6, 1948 |